June 20, 1944.  S. WULFF  2,351,650
WHEEL SUSPENSION FOR VEHICLES
Filed March 1, 1941
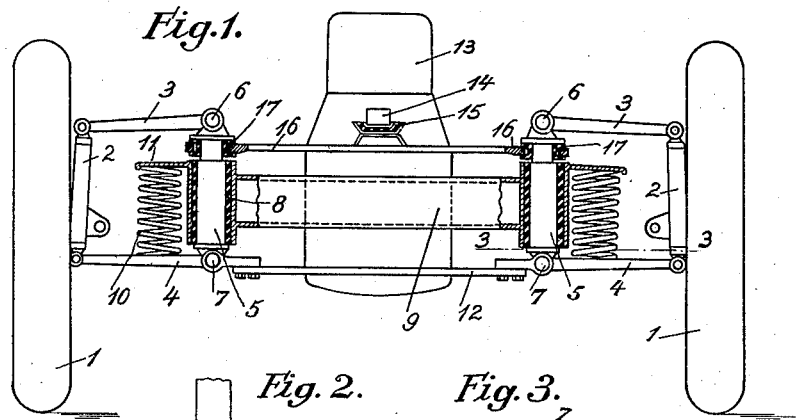
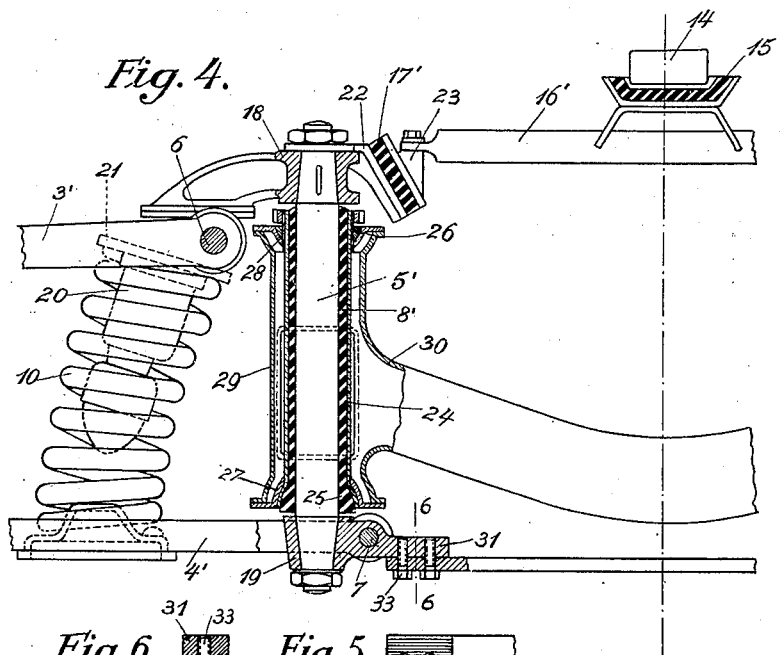
INVENTOR
Siegfried Wulff
BY
ATTORNEYS Patented June 20, 1944

2,351,650

UNITED STATES PATENT OFFICE 2,351,650

WHEEL SUSPENSION FOR VEHICLES

Siegfried Wulff, Stuttgart-Bad Cannstatt, Germany; vested in the Alien Property Custodian Application March 1, 1941, Serial No. 381,313
In Germany February 12, 1940

15 Claims. (Cl. 180—64)

The present invention relates to a wheel suspension for vehicles, especially for motor vehicles having a supporting member resiliently mounted at the frame. More particularly, the invention is concerned with a wheel suspension for motor vehicles in which the wheel suspension members of at least two wheels, preferably of each wheel or a portion of same are mounted upon a supporting member, resiliently arranged at the frame, for example upon a supporting pivot substantially resiliently mounted about a vertical axis.

The invention consists in this that the driving unit, such as the motor or in any event another driving aggregate (e. g. the differential) of the vehicle is mounted upon the preferably resiliently arranged supporting members for the wheel suspension members instead of upon the frame. Preferably elastic members are hereby interposed between the motor and the supporting members.

In contradistinction to the hitherto used arrangements in which the motor or other driving aggregates were mounted upon the frame, the construction according to the present invention has the advantage that vibrations of the motor or the corresponding other driving aggregate are transmitted not upon the frame but directly upon the supporting members serving for mounting the wheels. It is further of advantage that the weight of the motor may directly counteract shocks and vibrations resulting from the road so that the effect of these vibrations upon the frame is reduced. Hereby the frame on the one hand is released from the large strains otherwise occurring, and on the other hand critical vibrations may be prevented without difficulty, which otherwise often only may be controlled with difficulty and cause inconvenient vibration phenomena.

Other advantageous constructions of the wheel suspension according to the present invention may be gathered from the following specification.

In the accompanying drawing some embodiments of wheel suspensions according to the invention are shown by way of example.

In this drawing:

Fig. 1 is a diagrammatic view, partially in section, of a front axle according to the invention;

Fig. 2 shows a plan view of the means for guiding the left-hand wheel;

Fig. 3 is a plan view in section on the line 3—3 of Fig. 1 showing the means for guiding the right-hand wheel;

Fig. 4 shows a modification of a wheel suspension according to the invention on a larger scale and partially in section;

Fig. 5 is a plan view of the one end of a lower transverse member to be later described; and Fig 6 is a section on the line 6—6 of Fig. 4.

In the construction shown in Fig. 1 the dirigible wheels 1 are carried by the wheel supports 2 which are connected by an upper link 3 and a lower link 4 as well as by joints 6 and 7 respectively to a vertical supporting pivot 5. The latter is mounted, for example, by means of a rubber sleeve 8 in the frame 9 of the vehicle, the rubber sleeve allowing yielding of the supporting pivot mainly about its vertical axis. To absorb shocks of the wheel, a spring, such as a coiled spring 10 is provided, which is not guided and the ends of which on the one hand bear against the lower link 4 and on the other hand against a bearing bracket 11 provided, for example, at the frame. To absorb the forces which tend to swing the wheel suspension about the axis of the supporting pivot 5, any desired means such as a resilient member, for example a leaf spring 12, may be provided, which connects the two supporting pivots 5 at both sides of the longitudinal central plane of the vehicle.

According to the invention the motor 13, moreover, is mounted upon a transverse member 16 by a fastening member, for example by a front bearing eye 14 or a flange and an interposed rubber buffer 15. The transverse member 16 connects the upper ends of the supporting pivots 5 to each other. Between the transverse member 16 and the supporting pivots 5 other rubber blocks 17 are provided which particularly serve the purpose of compensating the movements resulting from the resilient mounting of the supporting pivots 5, the motor not being forced to follow these movements. The transverse member 16 also preferably is somewhat elastic, more particularly capable of being elastically bent, to still further reduce as far as possible the mutual influencing of motor and wheel suspension. To increase the resiliency the transverse member 16 may correspondingly be curved instead of being constructed in a straight line.

In the modification shown in Fig. 4 the elements also illustrated in Figs. 1–3 are designated with the corresponding reference characters used in Figs. 1–3 for such elements. In this case the two bearing members 18 and 19 are rigidly mounted upon the supporting pivots 5'. The bearing member 18 serves for mounting the upper link 3' and the bearing member 19 for mounting the lower link 4'. Moreover, a shock absorber 20 as well as an abutment 21 for the coiled spring 10 are also arranged at the upper bearing member 18.

Fixed upon the upper end of the supporting pivot 5' is an angle iron 22 which by way of the interposed rubber block 17' is adherently connected to another metal member 23. Connected to the latter is the transverse member 16' which is capable of being elastically bent and which is carrying the motor. The arrangement hereby is such that the rubber block 17' of substantially rectangular cross section between its connecting surfaces is obliquely inclined downwardly towards the centre longitudinal plane of the vehicle. The forces produced by the weight of the motor or other forces acting in vertical direction, therefore, substantially are absorbed by the rubber blocks 17', whereas the rubber block 15 allows substantially torsional vibrations of the motor. This rubber block is, for example in a manner known per se, also arranged between metal elements and adherently connected to the latter. Vertical vibrations are absorbed by the transverse member 16' which is capable of being somewhat elastically bent. The resilient members 15, 16', and 17' arranged between the motor 13 and the supporting pivots 5' are of sufficient resiliency in the horizontal direction to allow the required yielding of the supporting pivot 5', particularly the yielding about the vertical axis of the pivot, and to prevent shocks occurring at the wheel suspension to be transferred to the motor, which would be highly undesired.

To ensure a safe mounting of the supporting pivot 5' on the frame allowing an adjustment, the rubber sleeve 8' surrounding the supporting pivot is inserted in a metal sleeve 24 which by means of a ball-like end surface 25 and a ball-like intermediate ring 26 respectively bears against ball-like bearing caps or covers 27 and 28 which are mounted upon the open ends of a vertical frame sleeve 29. The latter in turn is arranged at the point of connection of a transverse beam 30 of the frame to a longitudinal beam of the frame which, for example, may also be of tube- or box-like formation. The frame sleeve 29 is welded to these frame beams to form a solid unit with same.

As may also be seen from Fig. 4, the lower transverse member 12', formed as a flat iron or a spring leaf and serving to support the two supporting pivots 5' relatively to each other, is rigidly connected to the bearing member 19 for the lower guide link 4'. Accordingly the bearing member 19 has an inwardly directed flange 31 the lower surface of which is toothed or chequered at 32 in the longitudinal direction of the transverse member 12'. The end of the transverse member 12' also is correspondingly toothed or chequered. By means such as screws 33 the transverse member 12' is strongly pressed against the flange 31 of the bearing member 19, so that by means of the toothed or chequered part 32 a rigid coupling between these two parts is obtained in the direction of rotation about the axis of the supporting pivot 5'.

Yielding of the wheel suspension about the vertical axis of the supporting pivot 5', therefore, is possible only by a bending of the transverse member 12' in a horizontal plane, i. e., by bending forces acting along edges of the spring leaf 12.

It is understood that the wheel suspension members also may be mounted e. g. upon an U-shaped forging instead of on the supporting pivots above described.

Having now particularly described and ascertained the nature of my said invention and in what manner the same is to be performed, I declare that what I claim is:

1. In a vehicle having a frame, a pair of supporting members connected to said frame on opposite sides of said vehicle, a pair of wheel supports, two pairs of guiding links, one pair being pivotally connected at one end to one wheel support and at their other ends to one of said supporting members, and the other pair being pivotally connected at one end to the other wheel support and at their other ends to the other supporting member, means for resiliently springing one link of each pair relatively to the frame, a driving unit for said vehicle supported between said two supporting members, a yieldable transverse member interconnecting said two supporting members, for supporting said driving unit, and resilient means intermediate said driving unit and said yieldable member.

2. The combination according to claim 1, in combination with elastic connecting means for attaching said yieldable member between said oppositely positioned supporting members.

3. In a vehicle having a frame, a pair of supporting members connected to said frame on opposite sides of said vehicle, a pair of wheel supports, two pairs of guiding links, one pair being pivotally connected at one end to one wheel support and at their other ends to one of said supporting members, and the other pair being pivotally connected at one end to the other wheel support and at their other ends to the other supporting member, means for resiliently springing one link of each pair relatively to the frame, a yieldable transverse member, elastic connectors permitting yieldable movement in a substantially vertical direction, interconnecting said transverse member between said oppositely positioned supporting members, a driving unit, and further elastic connectors permitting yielding motion about a longitudinal axis of the vehicle for interconnecting said driving unit to said transverse member.

4. The combination according to claim 3, in which each supporting member comprises a substantially vertical pivot, and means for yieldably mounting said pivots on said frame for movement in all directions.

5. In a vehicle having a frame, a pair of supporting members resiliently connected to said frame on opposite sides of said vehicle, a pair of wheel supports, two pairs of guiding links, one pair being pivotally connected at one end to one wheel support and at their other ends to one of said supporting members, and the other pair being pivotally connected at one end to the other wheel support and at their other ends to the other supporting member, means for resiliently springing one link of each pair relatively to the frame, an engine for said vehicle, and means for supporting the said engine between said two supporting members, said last means including a yieldable transverse member interconnected with said two supporting members.

6. The combination according to claim 5, in which said last means includes elastic means connecting said transverse member with said supporting members, and elastic means for mounting said engine on said transverse member.

7. The combination according to claim 5, in which said last means includes elastic connecting means yieldable in a substantially vertical direction, connecting said transverse member with said supporting members, and elastic means yieldable about a longitudinal axis of the vehicle for mounting said engine on said transverse member.

8. The combination according to claim 5, in which each supporting member comprises a substantially vertical pivot movable relatively to the frame in all directions, and in which said last means includes elastic connecting means yieldable in a substantially vertical direction, connecting said transverse member with said supporting members, and elastic means yieldable about a longitudinal axis of the vehicle for mounting said engine on said transverse member.

9. In a vehicle having a frame, a pair of supporting members yieldably mounted on said frame on opposite sides of the vehicle, a pair of wheel supports, guiding means for connecting one wheel support to one supporting member and the other wheel support to the other supporting member for up and down movement of the wheel support relatively to the frame, a driving unit, means for supporting said driving unit between said two supporting members comprising a yieldable transverse member, and resilient means intermediate said driving unit and said yieldable member.

10. In a vehicle having a frame, a pair of supporting members yieldably connected to said frame on opposite sides of said vehicle, a pair of wheel supports, guiding means for connecting one wheel support to one supporting member and the other wheel support to the other supporting member for up and down movement relatively to said frame, a yieldable transverse member, elastic connectors permitting yieldable movement in a substantially vertical direction, interconnecting said transverse member between said oppositely positioned supporting members, a driving unit, and further elastic connectors permitting yielding motion about a longitudinal axis of the vehicle for interconnecting said driving unit to said transverse member.

11. The combination according to claim 10, in which each supporting member comprises a substantially vertical pivot, and means for yieldably mounting said pivot on said frame for movement in all directions.

12. The combination according to claim 10, in which each supporting member comprises a substantially vertical pivot, and means for yieldably mounting said pivot on said frame for movement about a substantially vertical axis.

13. The combination according to claim 9, in which the supporting members are formed as substantially perpendicular pivots, and the means for supporting said driving unit comprise first bearing members mounted on the perpendicular pivots, rubber blocks respectively rigidly connected with said first bearing members, and second bearing members rigidly connected with said rubber blocks, to which second bearing members said transverse member is connected.

14. The combination according to claim 9, in which the supporting members are formed as substantially perpendicular pivots, and in which the means for supporting said driving unit comprise first bearing members mounted on the perpendicular pivots, second bearing members respectively rigidly connected at opposite ends of said transverse member, and rubber blocks each having two substantially parallel surfaces extending obliquely to the horizontal and vertical planes, one of said surfaces being respectively rigidly interconnected with the first bearing member and the other with the second bearing member.

15. The combination according to claim 9, in which the supporting members are formed as substantially vertical pivots, and the guiding means comprises at least one guiding link for each wheel support having a bushing mounted upon said vertical pivot, and in which the means for supporting said driving unit between said supporting member includes a bearing piece on each bushing, elastic means on each bearing piece, and said transverse member connected between said elastic means.

SIEGFRIED WULFF.